US011802193B2

(12) United States Patent
Dustin et al.

(10) Patent No.: US 11,802,193 B2
(45) Date of Patent: Oct. 31, 2023

(54) CURE PROMOTER COMPOSITIONS AND METHODS FOR THE SAME

(71) Applicant: The Boeing Company, Chicago, IL (US)

(72) Inventors: Ashley Marie Dustin, Santa Monica, CA (US); Phuong Bui, Thousand Oaks, CA (US); Stella Fors, Los Angeles, CA (US); Andrew P. Nowak, Malibu, CA (US); Melinda Dae Miller, Snohomish, WA (US); Carissa Ann Pajel, Mercer Island, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/654,248

(22) Filed: Mar. 10, 2022

(65) Prior Publication Data

US 2022/0348738 A1 Nov. 3, 2022

Related U.S. Application Data

(60) Provisional application No. 63/180,732, filed on Apr. 28, 2021.

(51) Int. Cl.
| | |
|---|---|
| *C08K 5/40* | (2006.01) |
| *C08K 5/00* | (2006.01) |
| *B05D 3/10* | (2006.01) |

(52) U.S. Cl.
CPC ............ *C08K 5/0025* (2013.01); *B05D 3/108* (2013.01); *C08K 5/40* (2013.01)

(58) Field of Classification Search
CPC ......... C08K 5/0025; C08K 5/40; B05D 3/108
See application file for complete search history.

(56) References Cited

U.S. PATENT DOCUMENTS

| | | | |
|---|---|---|---|
| 2,879,262 A | 3/1959 | Sullivan | |
| 3,861,950 A | 1/1975 | Danielson et al. | |
| T974,003 I4 | 9/1978 | Millen | |
| 4,224,436 A | 9/1980 | Doss | |
| 4,334,043 A | 6/1982 | Groepper | |
| 4,983,685 A | 1/1991 | Aoshima et al. | |
| 5,177,182 A | 1/1993 | Lee et al. | |
| 6,747,099 B1 | 6/2004 | Novits et al. | |
| 10,189,925 B2 | 1/2019 | Zweig | |
| 2004/0254258 A1 | 12/2004 | Horikoshi et al. | |
| 2014/0023555 A1* | 1/2014 | Monzyk | A62D 3/37 252/188.1 |
| 2015/0307664 A1* | 10/2015 | Echigoya | C08G 59/56 568/50 |
| 2020/0190226 A1 | 6/2020 | Flack et al. | |

FOREIGN PATENT DOCUMENTS

| | | |
|---|---|---|
| EP | 0702072 A1 | 3/1996 |
| EP | 1319966 A1 | 6/2003 |
| EP | 1882713 A1 | 1/2008 |
| EP | 2128178 A1 | 12/2009 |
| EP | 2824129 A1 | 1/2015 |
| EP | 2881418 A1 | 6/2015 |

OTHER PUBLICATIONS

Extended European Search Report dated Jun. 13, 2022 in corresponding European Application No. 21216789.4, 10 pages.

* cited by examiner

*Primary Examiner* — Hai Y Zhang
(74) *Attorney, Agent, or Firm* — MH2 Technology Law Group LLP

(57) ABSTRACT

A cure promoter composition is disclosed, including an accelerator which may include a thiocarbamate, a hydrated thiocarbamate, a dithiocarbamate, a thiazole, a mercaptothiazole, a sulfenamide, a thiazolesulfenamide, a metal salt of thiocarbamate, sulfur chloride, or combinations thereof. The cure promoter composition also includes a compatibilizing carrier, one or more organic solvents, a catalyst, an optional reducing agent, an optional reactive silane, an optional reactive organometallic, an optional gelling agent, and an optional aqueous component. A method for applying the cure promoter composition is disclosed, including contacting the organic solvents, the accelerator, the carrier, the reactive silanes, the reactive organometallics, the reducing agents, and the catalyst with one another to prepare the cure promoter composition, homogenizing the cure promoter composition, pausing after homogenizing to allow the cure promoter time to react, applying a sealant onto a substrate, and applying the cure promoter composition to a surface of the sealant.

20 Claims, No Drawings

CURE PROMOTER COMPOSITIONS AND METHODS FOR THE SAME

CROSS-REFERENCE TO RELATED APPLICATIONS

This application claims priority to U.S. Provisional Patent Application No. 63/180,732, filed on Apr. 28, 2021, the entirety of which is incorporated by reference herein.

TECHNICAL FIELD

The present disclosure generally relates to the field of sealants. More particularly, the present disclosure relates to compositions for improving the process efficiency of the application of polymeric materials, such as polysulfide sealants with the use of a cure promoter.

BACKGROUND

Sealants play a vital role in the successful assembly of various aircraft components and see widespread use in both manufacturing and maintenance. In particular, sealants are used extensively in fuel tank applications within the aircraft structure as fastener fillets or as gap fillers. For example, commercial aircrafts that store fuel in wings and/or tanks located between the wings do not rely on bladders or liners to contain the fuel. Instead, commercial aircrafts may have metallic or composite fuel tanks as a primary structure to contain the fuel. As a result, joints and bolts must be properly sealed to eliminate fuel leakage, mitigate corrosion potential, and protect against arcing electrical discharge in the fuel storage in the event of a lightning strike.

Conventional application of the sealant at or around the area of the joints and bolts includes cleaning the area with a solvent and subsequent application of an adhesion promoter, or a Class A material (e.g., Class A polysulfide sealant, brushable sealant, etc.). After application of the adhesion promoter, a thioxotropic sealant (e.g., a Class B polysulfide sealant) can be applied and allowed to cure to complete the sealing system. The curing of the sealing system is often a lengthy process (e.g., up to 24 hours or more) that slows aircraft production and maintenance efficiencies.

What is needed, then, are improved compositions for improving process efficiency for sealant application and more efficient methods for preparing and utilizing the improved compositions and processes.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A cure promoter composition is disclosed. The cure promoter composition includes an accelerator which may include a thiocarbamate, a hydrated thiocarbamate, a dithiocarbamate, a thiazole, a mercaptothiazole, a sulfenamide, a thiazolesulfenamide, a metal salt of thiocarbamate, sulfur chloride, or combinations thereof. The cure promoter composition also includes a compatibilizing carrier. The cure promoter composition also includes one or more organic solvents. The composition also includes a catalyst. The cure promoter composition also includes an optional reducing agent. The cure promoter composition also includes optionally, one or more reactive silanes. The composition also includes one or more optional reactive organometallics, one or more optional gelling agents, and an optional aqueous component.

Embodiments of a cure promoter composition are disclosed where the accelerator is disulfiram. In certain embodiments, the compatibilizing carrier may include a monomer, an oligomer, a low molecular weight polysulfides, a low molecular weight polythiol, a low molecular weight vinyl functional compound, an organic solvent, or combinations thereof. The cure promoter composition may include pentaerythritol tetrakis(3-mercaptopropionate), trimethylolpropane tris(3-mercaptopropionate), 2,2'-thiodiethanethiol, 2,2'-(ethylenedioxy)diethanethiol, tris(mercaptoalkyl)cyclohexanes, or combinations thereof. The compatibilizing carrier may include allyl monosulfide, allyl disulfide, ethyl vinyl sulfide, phenyl vinyl sulfide, styrene, or combinations thereof. The one or more organic solvents in the cure promoter composition may include an aliphatic hydrocarbon, an aromatic compound, a ketone, an amine, an ester, an alcohol, an aldehyde, an ether, or combinations thereof. The catalyst of the cure promoter composition may include an amidine, a diazole, an amine, a pyridine, or combinations thereof. The cure promoter composition may include one or more reducing agents, the reducing agent may include cysteamine, betamercaptoethanol, dithiothreitol, tris(2-carboxyethyl) phosphine hydrochloride, dithiobutylamine, glutathione, or combinations thereof. The cure promoter composition may include one or more reactive silanes, the one or more reactive silanes may include a glycidoxypropyltrimethoxysilane, a mercaptopropyltrimethoxysilane, or combinations thereof. The cure promoter composition may include one or more reactive organometallics, the one or more reactive organometallics may include a reactive titanate, a reactive zirconate, a reactive aluminate, or combinations thereof. The cure promoter may include one or more gelling agents, and where the cure promoter composition having one or more gelling agents may have a viscosity of about 0.001 to about 2000 pas at a shear rate of about 0.1 to about 100 sec-1. The cure promoter composition may include no gelling agent wherein the cure promoter composition has a viscosity of about 0.001 to about 50 pas at a shear rate of about 0.1 to about 100 sec-1.

A method for applying the cure promoter composition is disclosed. The method for applying the cure promoter composition may include contacting the one or more organic solvents, the accelerator, the compatibilizing carrier, the one or more optional reactive silanes, the one or more optional reactive organometallics, the optional one or more reducing agents, and the catalyst with one another to prepare the cure promoter composition, homogenizing the cure promoter composition, pausing after homogenizing to allow the cure promoter time to react, applying a sealant, resin, paint layer, or combinations thereof onto a substrate, and applying the cure promoter composition to a surface of the sealant, resin, paint layer, or substrate. The method for applying the cure promoter composition may include pausing to allow the sealant, resin, paint layer, or combinations thereof to cure completely. The method for applying the cure promoter composition may include abrading the surface of the sealant, resin, paint layer, or combinations thereof. The method for applying the cure promoter composition may include contacting a first portion may include the one or more organic solvents, the accelerator, and the catalyst in a first container, contacting a second portion may include the one or more organic solvents the compatibilizing carrier, the one or more optional reactive silanes, the one or more optional organometallics, and the optional one or more reducing agents in a second container, and contacting contents of the first container with contents of the second container prior to applying the cure promoter composition to the substrate. The substrate may include an aluminum surface, a carbon fiber composite surface, or combinations thereof.

Another method for applying a cure promoter composition is disclosed. The method for applying a cure promoter composition also includes contacting one or more organic solvents, an accelerator which includes a thiocarbamate, a hydrated thiocarbamate, a dithiocarbamate, a thiazole, a mercaptothiazole, a sulfenamide, a thiazolesulfenamide, a metal salt of thiocarbamate, sulfur chloride, or combinations thereof, a compatibilizing carrier, one or more optional reactive silanes, one or more optional organometallics, and a catalyst with one another to prepare a cure promoter composition, and homogenizing the cure promoter composition. The method for applying a cure promoter composition also includes applying a sealant, resin, paint layer, or combinations thereof onto a substrate. The method for applying a cure promoter composition also includes applying the cure promoter composition to a surface of the sealant, resin, paint layer, or combinations thereof, evaporating the one or more organic solvents from the cure promoter composition, and pausing to allow the cure promoter time to react.

The features, functions, and advantages that have been discussed can be achieved independently in various implementations or can be combined in yet other implementations further details of which can be seen with reference to the following description.

DETAILED DESCRIPTION

During the assembly of various aircraft components, sealants and finishes play an integral role in terms of component manufacturing and maintenance. Sealants in particular are extensively used in fuel tank and other critical components to prevent leaks, corrosion, and electromagnetic effects, such as lightning strikes. Current processes for applying polysulfide and other sealants to aircraft components is time consuming and slows down efficient aircraft production and maintenance. An exemplary process involving a fastener fillet sealing includes, abrasion of a substrate panel, brush application of a low viscosity Class A polysulfide sealant onto a surface or substrate. After this first Class A sealant is applied, a thixotropic Class B polysulfide sealant is applied over the top of the Class A polysulfide sealant and allowed to cure.

Cure promoter compositions as described herein can improve the processibility and application efficiency of such sealants, in particular providing enhanced bonding and curing efficiency within and between polymeric materials such as paints and sealants applied onto aircraft or aerospace substrates such as aluminum and/or carbon fiber reinforced composites without additional preparation or process steps. These cure promoter compositions can be compositions of accelerators, compatibilizing carriers, catalysts, reducing agents, an aqueous component, reactive organometallic species based on aluminum, titanium, zirconium or combinations thereof and combined with reactive silane coupling agents dispersed in organic solvents (MEK, MIBK, etc.). The cure promoter composition can be applied as a low viscosity solution or incorporated into a gelled solvent for enhanced application convenience. The use of a cure promoter along with a Class B sealant may eliminate the need for additional materials and curing time for multiple layers of sealant composition. Furthermore, surface tack-free time reduction and through cure via topical application can be improved, and the material is effective on a variety of sealants. Additional benefits with the use of an optional gelling agent may facilitate the use of cure promoters in a higher viscosity or gel form, thus enabling their use in localized application in a specific target area where the adhesion promoter may remain where applied for an extended period if the surface is horizontal, vertical, or inverted in an overhead location.

As used herein, "free" or "substantially free" of a material can refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−5% of a stated target value, maximum, or minimum value.

All references cited herein are hereby incorporated by reference in their entireties. In the event of a conflict in a definition in the present disclosure and that of a cited reference, the present disclosure controls.

The present disclosure provides one or more cure promoter compositions. As used herein, the term "cure promoter" refers to a class of materials composed of an accelerator, a compatibilizing carrier, a catalyst, an optional reducing agent, an optional gelling agent, an optional liquid reactive silane or reactive organometallic composition, and an optional aqueous component within an organic solvent. The cure promoter compositions disclosed herein may include one or more optional functional additives or agents capable of or configured to improve upon conventional methods of preparing a surface for treatment or application of a sealant. For example, as further described herein, the cure promoter compositions disclosed herein can be capable of or migrating or diffusing within the bulk of an applied sealant or surface coating material, thereby effectively reducing processing or curing time of a sealant or surface coating application, as well as any other preparation steps such as sanding or surface abrasion. As the cure promoter migrates or diffuses into the bulk of a sealant material, it carries in and disperses within a sealant material, ingredients that may participate in and/or enhance the crosslinking or curing properties of the sealant material. Further, a "compatibilizing carrier," as used herein, is a term referring to a class of material that via its inherent low viscosity, surface tension, or other properties, provides a means to help diffuse or migrate an accelerator, a catalyst, reactive silane, reactive titanate, or other functional material to disperse within the bulk of a sealant layer without any required mixing or agitation. Accordingly, the cure promoter composition disclosed herein provides methods for reducing the amount of time necessary to seal a surface with a sealant, as compared to conventional methods, thereby reducing manufacturing cycle times for the product being manufactured (e.g., aircrafts), which leads to a significant cost savings. The cure promoter compositions disclosed herein are also capable of or configured to provide or facilitate the identification of an area or surface treated with the cure promoter composition (e.g., via an indicator).

Compositions disclosed herein can be or include a cure promoter composition including one or more accelerators, one or more compatibilizing carriers, one or more catalysts, one or more organic solvents, one or more reactive silanes, one or more reactive organometallics, one or more optional gelling agents, one or more optional functional additives, an aqueous component, or combinations thereof. The cure promoter composition can be capable of or configured to prepare a surface for subsequent treatment or application of a sealant (e.g., polysulfide sealant) or be applied to the surface of a sealant after application. For example, the cure promoter composition can be capable of or configured to clean the surface and/or prime a surface for subsequent treatment or application of a sealant. For example, the cure promoter composition can be capable of or configured to clean the surface and/or prime a surface for subsequent treatment or application of polymeric materials, such as a polysulfide sealant. The cure promoter composition can be capable of or configured to clean one or more of lubricants, such as drilling lubricants, coolants, greases, waxes, or the like, or any combination thereof, from surfaces to be treated. For example, the cure promoter composition can be capable or configured to be applied to a sealant, polymer, or resin layer to cause or influence a crosslinking or curing reaction in the sealant, polymer, or resin layer by nature of its chemical composition and/or physical properties. Accordingly, the cure promoter compositions disclosed herein can be referred to as multifunctional cure promoter compositions. The cure promoter compositions for sealants and finishes as described herein may exhibit reaction with various substrates and sealants via multiple mechanisms. For example, some reactive organometallic preparations may react more rapidly than reactive silanes under various conditions and/or environments which may eliminate the necessity for lengthy processing steps related to the application of finishes or sealants, including but not limited to surface preparation steps such as sanding, abrading, and the like. In some multifunctional cure promoters according to embodiments herein, the multifunctional cure promoter may also act as an adhesion promoter when applied between a substrate and a sealant. When a multifunctional cure promoter is applied in between substrate and sealant as an adhesion promoter, the substrate needs not to be sanded. When a multifunctional cure promoter is applied as a cure promoter on top of the sealant, the sealant surface can be sanded after the reaction time has elapsed.

The cure promoter composition may be applied to a substrate or a sealant surface and provided reaction time to react either with atmospheric moisture during application, resident functional group chemistry of the substrate or within the bulk of the sealant layer to improve crosslinking or cure efficiency during a sealant application process. The cure promoter composition can have a reaction time in which the surface becomes tack-free of from about 10 seconds (sec) to about 2 hours (hrs), at a temperature of about 25° C. For example, the cure promoter composition can have a reaction time of from about 10 sec, about 60 sec, about 5 min, about 10 min, about 30 min, about 45 min, or about 60 min to about 65 min, about 70 min, about 90 min, about 100 min, or about 120 min, at a temperature of about 25° C. An intermediate cure of the sealant may take place after exposure to the cure promoter for a period of from about 1 hour to about 6 hours at 25° C. A full cure of the sealant may take place after exposure to the cure promoter for a period of from about 6 hours to about 8 hours at 25° C. This can be contrasted with commercial sealants without cure promoters which typically take approximately 5 hours to about 6 hours to have a tack-free surface and from about 6 hours to about 12 hours to completely fully cure. It should be appreciated that the reaction time may be present during fabrication or preparation of the cure promoter composition.

The cure promoter composition can exclude, be free, or substantially free of agar and/or agar gels. For example, the cure promoter composition can exclude, be free, or substantially free of agar as a solvent gel, such as in agar-based gels. The cure promoter composition can exclude, be free, or substantially free of organic or polymeric gelling agents in certain embodiments.

The one or more reactive silanes, also referred to as silane adhesion promoters or silane coupling agents, of the cure promoter composition can be capable of or configured to facilitate adhesion of a sealant applied to a surface after treatment with the cure promoter composition. For example, the adhesion promoter can be capable of or configured to promote compatibility and/or adhesion between two different sealant layers or between a sealant layer and a substrate, or combinations thereof.

The cure promoter composition can include one or more accelerators. As used herein, the term "accelerator" can refer to any component, compound, or substance that facilitates or promotes the curing of the polymeric material, such as polysulfide sealants. Accelerants may be consumed in the process of their reaction. Illustrative accelerators of the cure promoter composition can be or include, but are not limited to, N, N-dimethyl-para-toluidine (DMPT), N-(2-hydroxyethyl)-N-methyl-para-toluidine (MHPT), or combinations thereof. Illustrative accelerators of the cure promoter composition can also include, but are not limited to those cure promoters capable of promoting the cure of sealant material and form a network within the optional gelling agent component during an initial synthesis, such as prior to packaging in a container. Illustrative accelerators of the cure promoter composition can also include, but are not limited to thiocarbamates, hydrated thiocarbamates, dithiocarbamates, sulfides, thiazoles, mercaptothiazoles, sulfenamides, thiazolesulfenamides, thiurams, thioureas, thiophosphates, metal salts of thiocarbamates, sulfur chloride, or combinations thereof. For example, the cure promoters can include thiuram, thiuram disulfide, tetrabenzylthiuram disulfide such as WESTCO™ TBzTD, tetramethyl thiuram disulfide, tetraethyl thiuram disulfide (disulfiram), tetramethylthiuram monosulfide, dipentamethylene thiuram tetrasulfate, dipentaethylene thiuramelemental sulfur, tetraethyldisulfanedicarbothioamide, 2,2-dithiobis(benzothiazole) (MBTS, MBT, ZMBT, N-tert-butyl-2-benzothiazole sulfenamide (TBBS), CBS, MBS, DCBS, Zn-dibenzyldithiocarbamate (ZDBC), ZDEC, ZMDC, ethylene thiourea (ETU), dibutylthiourea (DBTU), Zn—O,O-di-N-phosphorodithioate (ZBDP) or the like, or combinations thereof.

The one or more accelerator can be present in an amount of from about 0.01 weight % to about 10 weight %, based on a total weight of the cure promoter composition. For example, the one or more accelerators can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the cure promoter composition. In another example, the one or more accelerators can be present in an amount of from about 0.1 weight % to about 10 weight %, about 2 weight % to about 8 weight %, or about 4 weight % to about 6 weight %.

The cure promoter composition can include one or more initiators, and/or coinitiators. As used herein, the term or expression "initiator" or "coinitiator" can refer to any component, compound, or substance that facilitates or promotes the polymerization and/or cross-linking of a sealant and/or between the one or more optional acrylates of the cure promoter composition.

The cure promoter composition can include one or more compatibilizing carriers. As used herein, the term "compatibilizing carriers" can refer to any component, compound, or substance that can dissolve the accelerator and is soluble in the organic solvent and the sealant and facilitates or promotes the migration or diffusion of the cure promoter composition into a sealant material.

A compatibilizing carrier may also include monomers, oligomers, low molecular weight polysulfides, low molecular weight polythiols, or combinations thereof. Illustrative compatibilizing carriers of the cure promoter composition can be or include, but are not limited to, include monomers, oligomers, low molecular weight polysulfides, or combinations thereof. For example, the cure promoters can include polythiols, and organic solvents which may have allyl, vinyl, acrylate and methacrylate functional groups, including allyl monosulfide, allyl disulfide, ethyl vinyl sulfide, phenyl vinyl sulfide, thiol-ene, multi-vinyl compounds, and combinations thereof. Illustrative compatibilizing carriers may include pentaerythritol tetrakis(3-mercaptopropionate), trimethylolpropane tris(3-mercaptopropionate), 2,2'-thiodiethanethiol, 1,4-butanedithiol, 2,2'-(ethylenedioxy)diethanethiol, tris(mercaptoalkyl) cyclohexanes, styrene, vinyl-functional silanes, Thiokol™ liquid polymer polysulfide, and combinations thereof.

The one or more compatibilizing carriers can be present in an amount of from about 0.01 weight % to about 50 weight %, based on a total weight of the cure promoter composition. For example, the one or more cure promoters can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the cure promoter composition. In another example, the one or more compatibilizing carriers can be present in an amount of from about 0.1 weight % to about 20 weight %, about 2 weight % to about 15 weight %, or about 4 weight % to about 10 weight %.

The one or more adhesion promoters can be or include, but are not limited to, one or more compounds including at least one reactive silane, or organometallics including reactive titanate, reactive zirconate, reactive aluminates, or the like, or any combination thereof. Organosilanes are generally understood to be, but not necessarily limited to, multifunctional silicon-containing molecules that include a reactive functional group and one or more hydrolysable alkoxy group. Illustrative silanes can include, but are not limited to, bis(trimethoxysilylethyl)benzene, bis(triethoxysilylethyl)benzene, 3-Acryloxypropyltrimethoxysilane, 3-Methacryloxypropyltrimethoxysilane, aminopropyltrimethoxysilane, vinyl trimethoxysilane, allyl trimethoxysilane, mercaptopropyltrialkoxysilanes (such as mercaptopropyltrimethoxysilanes 3-Mercaptopropyltrimethoxysilane), or combinations thereof. Illustrative glycidoxy functional or epoxy functional silanes may include, but are not limited to, glycidoxypropyltrialkoxysilane (such as glycidoxypropyltrimethoxysilanes, 3-glycidoxypropyltrimethoxysilane, 3-glycidoxypropyltriethoxysilane, and the like), 3-(2,3-epoxypropoxypropyl)methyldiethoxysilane, 2-(3,4-epoxycyclohexyl)ethyltrimethoxysilane, 3-(2,3-epoxypropoxypropyl)methyldimethoxysilane, 2-(3,4-Epoxycyclohexyl)ethylmethyldimethoxysilane, and combinations thereof. Illustrative mercapto functional silanes may include, but are not limited to, 3-mercaptopropyltriethoxysilane, 3-mercaptopropyltrimethoxysilane, 11-mercaptoundecyltrimethoxysilane, s-(octanoyl)mercaptopropyltriethoxysilane, (mercaptomethyl)methyldiethoxysilane, 3-mercaptopropylmethyldimethoxysilane, and combinations thereof.

Organometallics included in the cure promoter composition may include reactive titanate, reactive zirconate, reactive aluminates, or the like, or any combination thereof. Organometallic compounds are generally understood to be any member of a class of compounds containing at least one metal-to-carbon bond in which the carbon is part of an organic group. Organometallic compounds of the present disclosure may further include metal centers including metals such as, but not limited to, manganese (Mn), lithium (Li), magnesium (Mg), aluminum (Al), zinc (Zn), and iron (Fe). The metal centers may have, but are not limited to, from four to six organic ligands or reactive groups in the organometallic composition. The organometallics may have, but are not limited to, reactive groups or organic ligands including amines, vinyl groups, allyl ether groups, acrylic groups, or combinations thereof. The organometallics may have, but are not limited to, non-reactive groups including alkyl, alkoxy, fluoro, phosphates, or combinations thereof. The reactive titanates can, but are not required to, include at least one UV curable functional group, such as an acrylate functional group. The UV curable functional group allows the titanate adhesion promoter to cure or facilitate curing via exposure to UV. The titanate adhesion promoter can include an ethylenically unsaturated titanate containing compound, a neoalkoxy titanate containing compound, or combinations thereof. Illustrative titanate adhesion promoters can include, but are not limited to, tetra (2, 2 diallyoxymethyl)butyl, di(ditridecyl)phosphito titanate, commercially available as KR 55, from Kenrich Petrochemcials, Inc. (hereinafter "Kenrich") of Bayonne, N.J.; neopentyl(diallyl)oxy, trineodecanonyl titanatem, commercially available as LICA 01 from Kenrich; neopentyl(diallyl)oxy, tri(dodecyl)benzenesulfony titanate, commercially available as LICA 09 from Kenrich; neopentyl(diallyl)oxy, tri(dioctyl)phosphato titanate, commercially available as LICA 12 from Kenrich; neopentyl(dially)oxy, tri(dioctyl)pyro-phosphato titanate, commercially available as LICA38 from Kenrich; neopentyl (diallyl)oxy, tri(N-ethylenediamino)ethyl titanate, commercially available as LICA 44 from Kenrich; neopentyl(diallyl)oxy, tri(m-amino)phenyl titanate, commercially available as LICA 97 from Kenrich; neopentyl(diallyl)oxy, trihydroxy caproyl titanate, commercially available as LICA 99 from Kenrich; or the like, or combinations thereof.

The reactive zirconates can, but are not required to, include at least one UV curable functional group, such as a methylacrulate or an acrylate functional group. The zirconate adhesion promoters can include an ethylenically unsaturated zirconium containing compound, a neoalkoxy zirconate containing compound, or combinations thereof. Illustrative zirconate adhesion promoters can be or include, but are not limited to, tetra (2,2 diallyloxymnethyl)butyl, di(ditridecyl)phosphito zirconate, commercially available as KZ 55 from Kenrich; neopentyl(diallyl)oxy, trineodecanoyl zirconate, commercially available as NZ 01 from Kenrich; neopentyl(diallyl)oxy, tri(dodecyl)benzene-sulfony zirconate, commercially available as NZ 09 from Kenrich; neopentyl(diallyl)oxy, tri(dioctyl)phosphato zirconate, commercially available as NZ 12 from Kenrich; neopentyl(diallyl)oxy, tri(dioctyl)pyro-phosphato zirconate, commercially available as NZ 38 from Kenrich; neopentyl(diallyl)oxy, tri(N-ethylenediamino)ethyl zirconate, commercially available as NZ 44 from Kenrich; neopentyl(diallyl)oxy, tri(m-amino)phenyl zirconate, commercially available as NZ 97 from Kenrich; neopentyl(diallyl)oxy, trimethacryl zirconate, commercially available as NZ 33 from Kenrich; neopentyl(diallyl)oxy, triacryl zirconate, commercially available as NZ 39 from Kenrich; dineopentyl(diallyl)oxy, diparamino benzoyl zirconate, commercially available as NZ 37 from Kenrich; dineopentyl(aiallyl)oxy, di(3-mercapto) propionic zirconate, commercially available as NZ 66A from Kenrich; or combinations thereof.

As discussed above, the one or more adhesion promoters can also be or include, but are not limited to, one or more sealants. As used herein, the term or expression "sealant" can refer to compositions that can have the ability to resist atmospheric conditions such as moisture and temperature and at least partially block transmission of materials such as water, fuel, and other liquids and gases. It should be appreciated that sealants can have adhesive or curative properties. It should further be appreciated that the sealants can be generally identified by "Class," as determined by their viscosity. The cure promoter composition can be combined with Class A sealants, Class B sealants, Class C sealants, or any combination thereof. Class A sealants can generally have a viscosity of from about 100 poise to about 400 poise, and can generally be suitable for application by brushing, injecting, or spraying. Class A sealants can have an application time of about 0.5 hours to about 2 hours. Class B sealants can generally have a viscosity of from about 6000 to about 18000 poise, and can generally be suitable for application by extrusion gun or spatula. Class B sealants can have an application time of about 0.5 hours to about 2 hours. Class C sealants can generally have a viscosity between that of a Class A sealant and a Class B sealant. For example, Class C sealants can generally have a viscosity of from about 1000 to about 4000 poise, and can generally be suitable for faying surface or shim sealing, brush coating, or wet installation. Class C sealants can have an application time of about 2 hours to about 336 hours. Viscosity of the Class A, Class B, and Class C sealants can be measured by a cone and plate rheometer (ASTM D4287) or Brookfield viscometer (ASTM D2196). In an exemplary implementation, the one or more adhesion promoters includes a Class A sealant.

Illustrative sealant adhesion promoters can be or include, but are not limited to, one or more reactive silanes, one or more reactive titanates, one or more reactive zirconates, or the like, or combinations thereof.

The one or more adhesion promoters can be present in an amount of from about 0.01 weight % to about 25 weight %, based on a total weight of the cure promoter composition. For example, the one or more adhesion promoters can be present in an amount of from about 0.01 weight %, about 0.5 weight %, about 1 weight %, about 1.5 weight %, about 2 weight %, or about 2.5 weight % to about 2.75 weight %, about 3 weight %, about 3.5 weight %, about 4 weight %, about 4.5 weight %, or about 10.0 weight %, based on a total weight of the cure promoter composition. In another example, the one or more adhesion promoters can be present in an amount of from about 0.01 weight % to about 10.0 weight %, about 10.0 weight % to about 25 weight %, about 1 weight % to about 8.0 weight %, about 2.0 weight % to about 6.0 weight %, or about 5 weight %, based on a total weight of the cure promoter composition.

The one or more organic solvents of the cure promoter composition can be capable of or configured to disperse, solubilize, solvate, or otherwise dissolve one or more substances or components of the cure promoter composition. The one or more organic solvents of the cure promoter composition can also be capable of or configured to disperse, solubilize, solvate, or otherwise dissolve one or more substances, such as greases, oils, or debris, on surfaces contacted with the cure promoter composition. For example, the one or more organic solvents of the cure promoter composition can be capable of or configured to dissolve the one or more accelerators, the one or more compatibilizing carriers, the one or more catalysts, the one or more optional reducing agents, the one or more reactive silanes, the one or more reactive organometallics, the one or more optional gelling agents, the one or more functional additives, or combinations thereof. The one or more organic solvents can also be capable of or configured to prepare a surface for subsequent treatment or application of a sealant. For example, the one or more organic solvents can be capable of or configured to at least partially provide a cleaning treatment of a surface that is to be treated with a sealant, such as a polysulfide sealant. It should be appreciated that any organic solvent capable of or configured to dissolve one or more components of the cure promoter composition and/or prepare the surface for subsequent treatment or application of a sealant can be utilized.

The one or more organic solvents can be or include, but are not limited to, aliphatic hydrocarbons, aromatic compounds, such as aromatic hydrocarbons, halogenated hydrocarbons, nitrated hydrocarbons, ketones, amines, esters, alcohols, aldehydes, ethers, or the like, or combinations thereof.

Illustrative aliphatic hydrocarbons that can be utilized as the one or more organic solvents can be or include, but are not limited to, n-pentane, n-hexane, n-octane, n-nonane, n-decane, or homologues thereof, 2,2,4-trimethyl pentane, or the like, or any combination thereof.

Illustrative aromatic compounds that can be utilized as the one or more organic solvents can be or include, but are not limited to, cyclohexane, benzene, toluene, ethylebenzene, xylene, tetralin, hexafluoro xylene, or the like, or any combination thereof.

Illustrative halogenated hydrocarbons that can be utilized as the one or more organic solvents can be or include, but are not limited to, chloroform, methylene chloride, trichloro ethylene, dichloromethane, or the like, or combinations thereof.

Illustrative ketone organic solvents can be or include, but are not limited to, acetone, methyl ethyl ketone (MEK), diethyl ketone, methyl propyl ketone (MPK), dipropyl ketone, methyl isobutyl ketone (MIBK), cyclopentanone, cyclohexanone, methyl amyl ketone, n-methyl-2-pyrrolidone, diisobutyl ketone, acetophenone, or the like, or combinations thereof.

Illustrative esters that can be utilized as the one or more organic solvents can be or include, but are not limited to, methyl acetate, ethyl acetate, isopropyl acetate, n-butyl acetate, cellosolve acetate, or the like, or combinations thereof.

Illustrative alcohols that can be utilized as the one or more organic solvents can be or include, but are not limited to, methanol, ethanol, n-propanol, i-propanol, n-butanol, i-butanol, s-butanol, n-amyl alcohol, i-amyl alcohol, cyclohexanol, n-octanol, ethanediol, diethylene glycol, 1,2-propanediol, or the like, or combinations thereof.

Illustrative aldehydes that can be utilized as the one or more organic solvents can be or include, but are not limited to, furfuraldehyde, or the like.

Illustrative ethers that can be utilized as the one or more organic solvents can be or include, but are not limited to, diethyl ether, diisopropyl ether, dibutyl ether, methyl tert butyl ether, 1,4-dioxane, tetrahydrofuran, oligomers of perfluoropolyethers, such as the GALDEN® line, which is commercially available from Solvay of Houston, Tex., or the like, or combinations thereof.

Certain embodiments of cure promoter compositions as described herein may have very different viscosities which may be tailored according to their method of application. The amount of the one or more organic solvents present in the cure promoter composition can vary widely, or may include an optional gelling agent, both of which may directly influence the viscosity of a cure promoter composition. For example, a low viscosity composition may not include an optional gelling agent and may have a greater solvent composition. The low viscosity solvent compositions can be applied to a surface or between two substrates by way of brushing, airbrush spraying, spray gun, dropping, pouring, pipetting, wiping, and the like. The amount of the one or more organic solvents present can be at least partially determined by a target or desired viscosity of the cure promoter composition. The amount of the one or more organic solvents present in the cure promoter composition can be from about 75 weight % to about 99.5 weight %, based on a total weight of the cure promoter composition. For example, the amount of the one or more organic solvents present in a lower viscosity cure promoter composition can be from about 75 weight %, about 80 weight %, about 85 weight % or about 90 weight % to about 95 weight %, about 98 weight %, about 99 weight %, or about 99.5 weight %, based on a total weight of the cure promoter composition. In another example, the amount of the one or more organic solvents present in the cure promoter composition may be from about 75 weight % to about 99.5 weight %, about 80 weight % to about 99 weight %, about 85 weight % to about 95 weight %, or about 85 weight % to about 90 weight %, based on a total weight of the cure promoter composition.

The cure promoter composition having a lower viscosity can have a shear viscosity of from about 0.01 Pa·s to about 10 Pa·s, at a temperature of about 25° C. For example, the adhesion promoter composition can have a shear viscosity of from about 0.01 Pa·s, about 2 Pa·s, about 4 Pa·s, or about 5 Pa·s to about 6 Pa·s, about 8 Pa·s, about 9 Pa·s, or about 10 Pa·s at a temperature of about 25° C. In another example, the cure promoter composition can have a shear viscosity of from about 0.01 Pa·s to about 10 Pa·s, about 2 Pa·s to about 8 Pa·s, or about 4 Pa·s to about 6 Pa·s, at a temperature of about 25° C. The cure promoter composition can have a shear rate of about 0.1 Hz to about 100 Hz, at a temperature of about 25° C. The cure promoter composition can have a viscosity of about 0.01 to about 10 Pa·s at a shear rate of about 0.1 to about 100 sec$^{-1}$.

Certain embodiments of cure promoter compositions having a higher viscosity composition can include an optional gelling agent and may have a lower solvent composition as compared to a low viscosity cure promoter composition. The high viscosity solvent compositions can be applied to a surface or between two substrates by way of via an extrusion gun, syringe, brushing, rolling, spreading, wiping, and the like, and be suitable for application to overhead or vertical surfaces without running or sagging. The amount of the one or more organic solvents present can be at least partially determined by a target or desired viscosity of the higher viscosity cure promoter composition. The amount of the one or more organic solvents present in the cure promoter composition can be from about 25 weight % to about 95 weight %, based on a total weight of the cure promoter composition. For example, the amount of the one or more organic solvents present in the cure promoter composition can be from about 25 weight %, about 30 weight %, about 40 weight % or about 50 weight % to about 60 weight %, about 65 weight %, about 70 weight %, or about 75 weight %, based on a total weight of the cure promoter composition. In another example, the amount of the one or more organic solvents present in the cure promoter composition may be from about 45 weight % to about 85 weight %, about 45 weight % to about 50 weight %, about 55 weight % to about 65 weight %, or about 80 weight % to about 95 weight %, based on a total weight of the cure promoter composition.

The cure promoter composition having a higher viscosity can have a shear viscosity of from about 0.1 Pa·s to about 100 Pa·s, or from about 1.0 Pa·s to about 20 Pa·s, at a temperature of about 25° C. For example, the cure promoter composition can have a shear viscosity of from about 2.5 Pa·s, about 5 Pa·s, about 7.5 Pa·s, or about 10 Pa·s to about 15 Pa·s, about 20 Pa·s, about 30 Pa·s, or about 40 Pa·s at a temperature of about 25° C. In another example, the cure promoter composition can have a shear viscosity of from about 2.5 Pa·s to about 40 Pa·s, about 5 Pa·s to about 25 Pa·s, or about 10 Pa·s to about 20 Pa·s, at a temperature of about 25° C. The measurement of the cure promoter composition may be conducted at a shear rate of about 0.1 Hz to about 100 Hz, at a temperature of about 25° C. The cure promoter composition can have a viscosity of about 2.5 Pa·s to about 40 Pa s measured at a shear rate of about 0.1 to about 100 sec-1. The one or more gelling agents, which may be, but are not necessarily limited to acrylates, of the cure promoter composition can be capable of or configured to form a network with one another. For example, the one or more acrylates can be capable of or configured to interact (e.g., bond) with one another to form an acrylate-based network, such as a cross-linked acrylate based network. In another example, the one or more acrylates can be capable of or configured to polymerize into a cross-linked network or mesh that can swell with the solvent to provide a spreadable cure promoter composition. The one or more acrylates can be or include one or more monomers and/or one or more oligomers. The one or more acrylates can be or include acrylate monomers having a functionality of two or greater.

Illustrative acrylates can be or include, but are not limited to, one or more acrylates, methacrylates, diacrylates, triacrylates, polyacrylates, or the like, or combinations thereof. The one or more acrylates can also be or include, but are not limited to, Tetrahydrofurfuryl Methacrylate; Isodecyl Methacrylate; 2(2-Ethoxyethoxy) Ethylacrylate; Stearyl Acrylate; Tetrahydrofuryl Acrylate; Lauryl Methacrylate; Stearyl Methacrylate; Lauryl Acrylate; 2-Phenoxyethyl Acrylate; 2-Phenoxyethyl Methacrylate; Glycidyl Methacrylate; Isodecyl Acrylate; Isobomyl Methacrylate; Isooctyl Acrylate;

Tridecyl Acrylate; Tridecyl Methacrylate; Caprolactone Acrylate; Ethoxylated Nonyl Phenol Acrylate; Isobornyl Acrylate; Propoxylated Allyl Methacrylate; Methoxy Polyethylene Glycol Monomethacrylate; Polypropylene Glycol Monomethacrylate; Ethoxylated Nonyl Phenol Methacrylate; BetaCarboxyethyl Acrylate; Beta-Carboxyethyl Methacrylate; Octyl Acrylate; Decyl Acrylate; Octyl Methacrylate; Decyl Methacrylate; Ethoxylated Alkylphenol Acrylate; Ethoxylated Alkylphenol Methacrylate; Ebecryl™ 111, an Epoxy Monoacrylate commercially available from by UCB Chemicals of Brussels, Belgium; Ebecryl™ CL1039 a urethane Monoacrylate commercially available from UCB Chemicals; Hexadecyl Acrylate; Hexadecyl Methacrylate; Behenyl Acrylate; Behenyl Methacrylate; Nonyl Phenol Propoxylate Monoacrylate, Nonyl Phenol Propoxylate Monomethacrylate; Polyethylene Glycol Dimethacrylate; Polyethylene Glycol Diacrylate; Tetraethylene Glycol Diacrylate; Triethylene Glycol Diacrylate; Tripropylene Glycol Diacrylate; 1,3 Butylene Glycol Dimethacrylate; Ethoxylated Bisphenol A Dimethacrylate; Ethoxylated Bisphenol A Diacrylate; Cyclohexane Dimethanol Diacrylate; Cyclohexane Dimethanol Dimethacrylate; Polypropylene Glycol Diacrylate; Polypropylene Glycol Dimethacrylate; Polyethylene Glycol Diacrylate; Polyethylene Glycol Dimethacrylate; 1,6 Hexane Diol Diacrylate; 1,6 Hexane Diol Dimethacrylate; Propoxylated Neopentyl Glycol Diacrylate; Propoxylated Neopentyl Glycol Dimethacrylate; Ethoxylated Neopentyl Glycol Diacrylate; Ethoxylated Neopentyl Glycol Dimethacrylate; SR 9209, Alkoxylated Aliphatic Diacrylate commercially available from Sartomer of Exton, Pa.; Dipropylene Glycol Diacrylate; Dipropylene Glycol Dimethacrylate; Tripropylene Glycol Dimethacrylate; Ebecryl™ 150, a Bisphenol A derivative diacrylate commercially available from UCB Chemicals; Trimethylolpropane Trimethacrylate; Trimethylolpropane Triacrylate; Tris (2-Hydroxy Ethyl) Isocyanurate Triacrylate; Tris (2-Hydroxy Ethyl) Isocyanurate Trimethacrylate; Ethoxylated Trimethylolpropane Triacrylate; Propoxylated Trimethylolpropane Triacrylate; Ethoxylated Trimethylolpropane Trimethacrylate; Propoxylated Trimethylolpropane Trimethacrylate; Pentaerythritol Triacrylate; Pentaerythritol Trimethacrylate; Propoxylated Glyceryl Triacrylate; Propoxylated Glyceryl Trimethacrylate; Ethoxylated Glyceryl Triacrylate; Ethoxylated Glyceryl Trimethacrylate; Pentaerythritol Tetraacrylate; Di-Trimethylolpropane Tetraacrylate; Dipentaerythritol Pentaacrylate; Ethoxylated Pentaerythritol Tetraacrylate; SR 9041, a pentaacrylate Ester commercially available from Sartomer; SR 9008, an Alkoxylated Trifunctional Acrylate Ester commercially available from Sartomer; CD 9009, a trifunctional Methacrylate Ester commercially available from Sartomer; SR 9012, a trifunctional Acrylate Ester commercially available from Sartomer; CD 9050, a Monofunctional Acid Ester commercially available from Sartomer; CD 9051, a Trifunctional Acid Ester commercially available from Sartomer; SR 802, an Alkoxylated Diacrylate commercially available from Sartomer; SR 500 Trifunctional monomer commercially available from Sartomer; SR 515 Trifunctional monomer commercially available from Sartomer; SR 516 Difunctional monomer commercially available from Sartomer; SR 517 Trifunctional monomer commercially available from Sartomer; SR 518 Tetrafunctional monomer commercially available from Sartomer; SR 519 Trifunctional monomer commercially available from Sartomer; SR521 Difunctional monomer commercially available from Sartomer; SR63 3 Metallic Diacrylate commercially available from Sartomer; SR634 Metallic Dimethacrylate commercially available from Sartomer; SR 636 Metallic Diacrylate commercially available from Sartomer; SR 705 Metallic Diacrylate commercially available from Sartomer; SR 708, Metallic Dimethacrylate commercially available from Sartomer; SR 709, metallic Monomethacrylate commercially available from Sartomer; CN 934, Urethane Acrylate commercially available from Sartomer; CN 945, Trifunctional Urethane Acrylate commercially available from Sartomer; CN95 3, Urethane Acrylate commercially available from Sartomer; CN 961, Urethane Acrylate commercially available from Sartomer; CN 962, Urethane Acrylate commercially available from Sartomer; CN 963, Urethane Acrylate commercially available from Sartomer; CN 964, Urethane Acrylate commercially available from Sartomer; CN 965, Urethane Acrylate commercially available from Sartomer; CN 966, Urethane Acrylate commercially available from Sartomer; CN 980, Urethane Acrylate commercially available from Sartomer; CN 198, Urethane Acrylate commercially available from Sartomer; CN 982, Urethane Acrylate commercially available from Sartomer; CN 983, Urethane Acrylate commercially available from Sartomer; CN 984 Urethane Acrylate commercially available from Sartomer; CN 985, Urethane Acrylate commercially available from Sartomer; CN 986, Urethane Acrylate commercially available from Sartomer; CN 970, Urethane Acrylate commercially available from Sartomer; CN 971, Urethane Acrylate commercially available from Sartomer; CN 972, Urethane Acrylate commercially available from Sartomer; CN 973, Urethane Acrylate commercially available from Sartomer; CN 975, Hexafunctional Urethane Acrylate commercially available from Sartomer; CN 977, Urethane Acrylate commercially available from Sartomer; CN 978, Urethane Acrylate commercially available from Sartomer; CN 1 963, Urethane Methacrylate commercially available from Sartomer; CN 104, Epoxy Acrylate commercially available from Sartomer; CN 111, Epoxidized Soy Bean Oil Acrylate commercially available from Sartomer; CN 112, Epoxy Novolak Acrylate commercially available from Sartomer; CN 115, Modified Epoxy Acrylate commercially available from Sartomer; CN 117, Modified Epoxy Acrylate commercially available from Sartomer; CN 118, Acid modified Epoxy Acrylate commercially available from Sartomer; CN120 Epoxy Acrylate commercially available from Sartomer; CN 124, Epoxy Acrylate commercially available from Sartomer; CN 151, Epoxy Methacrylate commercially available from Sartomer; CN 130, Aliphatic Monoacrylate commercially available from Sartomer; CN 131, Aromatic Monoacrylate commercially available from Sartomer; CN 132, Aliphatic Diacrylate commercially available from Sartomer; CN 920, Polyester Acrylate commercially available from Sartomer; CN 704, Acrylated Polyester commercially available from Sartomer; CN 301, Polybutadiene Dimethacrylate commercially available from Sartomer; SB 400,401,402, 500,510, 520, Aromatic Acid Methacrylate commercially available from Sartomer; Ebecryl™ 745, Acrylated Acrylic commercially available from UCB Chemicals; Ebecryl™ 754 Acrylated Acrylic commercially available from UCB Chemicals; Ebecryl™ 1701 Acrylated Acrylic commercially available from UCB Chemicals; Ebecryl™ 1710 AcrylatedAcrylic commercially available from UCB Chemicals; Ebecryl™ 1755 Acrylated Acrylic commercially available from UCB Chemicals; Ebecryl™ 230 Acrylated Urethane commercially available from UCB Chemicals; Ebecryl™ 244, Acrylated Urethane commercially available from UCB Chemicals; Ebecryl™ 264 Acrylated Urethane commercially available from UCB Chemicals; Ebecryl™ 270 Acrylated Urethane commercially available from UCB Chemicals;

Ebecryl™ 284 Acrylated Urethane commercially available from UCB Chemicals; Ebecryl™ 1290 Acrylated Urethane commercially available from UCB Chemicals; Ebecryl™ 2001 Acrylated Urethane commercially available from UCB Chemicals; Ebecryl™ 4830 Acrylated Urethane commercially available from UCB Chemicals; Ebecryl™ 4833 Acrylated Urethane commercially available from UCB Chemicals; Ebecryl™ 4835 Acrylated Urethane commercially available from UCB Chemicals; Ebecryl™ 4842 Acrylated Urethane commercially available from UCB Chemicals; Ebecryl™ 4866 Acrylated Urethane commercially available from UCB Chemicals; Ebecryl™ 4883 Acrylated Urethane commercially available from UCB Chemicals; Ebecryl™ 5129 Acrylated Urethane commercially available from UCB Chemicals; Ebecryl™ 8301 Acrylated Urethane commercially available from UCB Chemicals; Ebecryl™ 8402 Acrylated Urethane commercially available from UCB Chemicals; Ebecryl™ 8800 Acrylated Urethane commercially available from UCB Chemicals; Ebecryl™ 8803 Acrylated Urethane commercially available from UCB Chemicals; Ebecryl™ 8804 Acrylated Urethane commercially available from UCB Chemicals; Ebecryl™ 8807 Acrylated Urethane commercially available from UCB Chemicals; Ebecryl™ 3604 Rubber modified Epoxy Acrylate commercially available from UCB Chemicals; Ebecryl™ 3605 Acrylated Bisphenol A Epoxy commercially available from UCB Chemicals; Ebecryl™ 3702 Fatty Acid Modified Epoxy Acrylate commercially available from UCB Chemicals; Ebecryl™ 3703 Amine Modified Bisphenol A Acrylate commercially available from UCB Chemicals; Ebecryl™ 3411 Fatty Acid Modified Epoxy Acrylate commercially available from UCB Chemicals; Ebecryl™ 3600 Amine Modified Bisphenol A Acrylate commercially available from UCB Chemicals; Ebecryl™ 168 Methacylated Acidic Monomer commercially available from UCB Chemicals; Ebecryl™ 170 Acrylated acidic monomer commercially available from UCB Chemicals; Ebecryl™ 350 Acrylated Silicone commercially available from UCB Chemicals; Ebecryl™ 1360 Silcone Hexaacrylate commercially available from UCB Chemicals; Genomer™ 4188 Urethane Acrylate commercially available from Rahn; Genomer™ 4205 Urethane Acrylate commercially available from Rahn; Genomer™ 4215 Urethane Acrylate commercially available from Rahn; Genomer™ 4246 Urethane Acrylate commercially available from Rahn; Genomer™ 4269 Urethane Acrylate commercially available from Rahn; Genomer™ 4297 Urethane Acrylate commercially available from Rahn; Genomer™ 4302 Urethane Acrylate commercially available from Rahn; Genomer™ 4312 Urethane Acrylate commercially available from Rahn; Genomer™ 4316 Urethane Acrylate commercially available from Rahn; Genomer™ 4510 Urethane Acrylate commercially available from Rahn; Genomer™ 4661 Urethane Acrylate commercially available from Rahn; Genomer™ 4205 Urethane Acrylate commercially available from Rahn; Genomer™ 5248 Urethane Acrylate commercially available from Rahn; Genomer™ 5275 Urethane Acrylate commercially available from Rahn; Genomer™ 5695 Urethane Acrylate commercially available from Rahn; Genomer™ 7154 Urethane Acrylate commercially available from Rahn; Photomer® 5018, polyester acrylate commercially available from Photomer Energy Curing Chemicals; Photomer® 5018, polyester acrylate commercially available from Photomer Energy Curing Chemicals; RCC™ 13-429, polyester acrylate commercially available from Photomer Energy Curing Chemicals; RCC™ 13-430, polyester acrylate commercially available from Photomer Energy Curing Chemicals; RCC™ 13-432, polyester acrylate commercially available from Photomer Energy Curing Chemicals; RCC™ 13-433, polyester acrylate commercially available from Photomer Energy Curing Chemicals; Photomer® 6008, Urethane Acrylate commercially available from Photomer Energy Curing Chemicals; Photomer® 6010, Urethane Acrylate commercially available from Photomer Energy Curing Chemicals; Photomer® 6022, Urethane Acrylate commercially available from Photomer Energy Curing Chemicals; Photomer® 6184, Urethane Acrylate commercially available from Photomer Energy Curing Chemicals; Photomer® 6210, Urethane Acrylate commercially available from Photomer Energy Curing Chemicals; Photomer® 6217, Urethane Acrylate commercially available from Photomer Energy Curing Chemicals; Photomer® 6788-20R, Urethane Acrylate commercially available from Photomer Energy Curing Chemicals; Photomer® 6893, Urethane Acrylate commercially available from Photomer Energy Curing Chemicals; RCC™ 12-891, Urethane Acrylate commercially available from Photomer Energy Curing Chemicals; RCC™ 12-892, Urethane Acrylate commercially available from Photomer Energy Curing Chemicals; RCC™ 13-363, Urethane Acrylate commercially available from Photomer Energy Curing Chemicals; Photomer® 6173, Aromatic Acrylate commercially available from Photomer Energy Curing Chemicals; RCC™ 13-424, Polyester Acrylate commercially available from Photomer Energy Curing Chemicals. In an exemplary implementation, the one or more acrylates include polybutadiene dimethacrylate, pentaerythritol tetraacrylate, or the like, or combinations thereof.

The amount of the one or more acrylates present in the cure promoter composition can vary widely. The amount of the one or more acrylates present can be at least partially determined by a target or desired viscosity of the cure promoter composition. The amount of the one or more acrylates present in the cure promoter composition can be from about 1 weight % to about 25 weight %, based on a total weight of the cure promoter composition. For example, the amount of the one or more acrylates present in the cure promoter composition can be from about 1 weight %, about 5 weight %, or about 10 weight % to about 15 weight %, about 20 weight %, or about 25 weight %, based on a total weight of the cure promoter composition. In another example, the amount of the one or more acrylates present in the cure promoter composition can be from about 1 weight % to about 25 weight %, about 5 weight % to about 20 weight %, or about 10 weight % to about 15 weight %.

The cure promoter composition can include one or more optional functional additives capable of or configured to provide additional functional properties to the cure promoter composition. The one or more optional functional additives can be or include, but are not limited to, one or more indicators (e.g., visual indicators), one or more abrasives, one or more plasticizers, one or more surfactants, one or more flame retardant agents, one or more biocides, one or more tackifiers capable of or configured to modify tack of the cure promoter composition, one or more cure promoters, one or more accelerants, or the like, or any combination thereof. Examples of optional functional additives referred to herein are discussed further in turn below. The optional functional additives may be combined with the cure promoter composition to add one or more functionalities alone or in combination with other additives for further functionalities.

The cure promoter composition can include one or more catalysts. As used herein, the term "catalyst" can refer to any component, compound, or substance that can increase the rate of a chemical reaction related to sealant crosslinking, without necessarily undergoing a permanent chemical change.

The catalyst can be or include, but is not limited to, one or more amidines, diazoles, amines, pyridines, and combinations thereof. Illustrative catalysts can be or include, but are not limited to, one or more azo compounds, such as 4,4'-azobis(4-cyanovaleric acid), 1,1'-azobis(cyclohexanecarbonitrile), azobisisobutyronitrile, 2,2'-azobis(2-methylpropionitrile), or 2,2'-Azobis(2-methylpropionitrile), one or more inorganic peroxides, such as ammonium persulfate, hydroxymethanesulfinic acid monosodium salt dihydrate, potassium persulfate, or sodium persulfate, one or more organic peroxides, such as benzoyl peroxide, t-butyl hydroperoxide, cumene hydroperoxide, dicumyl peroxide, t-butyl peroxide, or the like, or any combination thereof. The illustrative catalysts can also be or include, but are not limited to, one or more organic photoinitiators, such as one or more acetophenone, one or more benzyl and benozoin compounds, one or more benzophenones, one or more cationic photoinitiators, one or more thioxanthones, camphorquinone, 1-methylimidazole, 2-(dimethylamino)ethyl methacrylate, 1,8-diazabicyclo[5.4.0]undec-7-ene, pyridine, ethylenediaminetetraacetic acid (EDTA), or the like, or any combination thereof.

The one or more catalysts can be present in an amount of from about 0.1 weight % to about 10 weight %, based on a total weight of the cure promoter composition. For example, the one or more catalysts can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the cure promoter composition. In another example, the one or more catalysts can be present in an amount of from about 0.1 weight % to about 5 weight %, about 0.5 weight % to about 2.5 weight %, or about 0.5 weight % to about 1.0 weight %.

The cure promoter composition can include one or more reducing agents. As used herein, the term "reducing" can refer to any component, compound, or substance that can lose or donate one or more electrons to an electron recipient or oxidizing agent. In the context of a cure promoter composition, as described herein, a reducing agent can reduce a sulfide functional group or component included in the cure promoter composition or sealant composition, or both, into a thiol functional group.

Illustrative reducing agents can be or include, but are not limited to, cysteamine, betamercaptoethanol, dithiothreitol, tris(2-carboxyethyl) phosphine hydrochloride, dithiobutylamine, glutathione, tertiary amines, azo compounds, amine-functional silanes, or the like, or any combination thereof. The illustrative reducing agents can also be or include, but are not limited to, one or more amine-functional reducing agents, such as 1-methylimidazole, m-xylenediamine, 4, N, N-trimethyl aniline, or the like, or any combination thereof.

The one or more reducing agents can be present in an amount of from about 0.1 weight % to about 10 weight %, based on a total weight of the cure promoter composition. For example, the one or more reducing agents can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the cure promoter composition. In another example, the one or more reducing agents can be present in an amount of from about 0.1 weight % to about 10 weight %, about 2 weight % to about 8 weight %, or about 4 weight % to about 6 weight %.

The cure promoter composition may include, but is not limited to, an aqueous component. An aqueous component contains water, and may include, but is not limited to, water soluble additives, other surfactants, minerals, salts, acids, bases, buffers, or combinations thereof. A water or aqueous component included in the cure promoter composition may participate or initiate a reaction in one or more of the other components or the cure promoter composition, such as the one or more reactive silanes, the one or more reactive organometallics, the one or more reducing agents, or combinations thereof. For example, the alkoxysilyl groups in a silane react with water to form silanol groups. These silanol groups may be unstable and over time will undergo condensation. A condensation reaction may result in the formation of crosslinking between silane molecules, as well as gelation. A adjusting the pH of the aqueous component may improve the stability of these silanol groups. Meanwhile, amino silanes are very stable in aqueous solutions, due to interaction of the amino groups. The water or aqueous component may also dissolve or solubilize one or more components or additives included in the cure promoter composition.

The aqueous component can be present in an amount of from about 0.1 weight % to about 10 weight %, based on a total weight of the cure promoter composition. For example, the aqueous component can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the cure promoter composition. In another example, the aqueous component can be present in an amount of from about 0.1 weight % to about 10 weight %, about 2 weight % to about 8 weight %, or about 4 weight % to about 6 weight %.

The one or more indicators or visual indicators can be capable of or configured to facilitate, promote, or provide identification of an area or surface treated with the cure promoter composition. For example, the visual indicators can be capable of or configured to allow a user to identify what surfaces or areas have been treated by the cure promoter composition in varying environments (e.g., low light, confined space, etc.). The one or more indicators can be or include, but are not limited to, one or more dyes, pigments, ultraviolet (UV) indicators, or the like, or combinations thereof. The one or more indicators can be visible in the visible spectrum (wavelength of 380 nm to 700 nm), the UV spectrum (wavelength of 10 nm to 380 nm), or combinations thereof. The one or more indicators can absorb in the UV spectrum and emit in the visible spectrum. Said in another way, the visual indicator can absorb energy in the ultraviolet spectrum, and the visual indicator can emit energy in the visible spectrum. The one or more indicators can include one or more fluorescent compounds, phosphorescent compounds, or combinations thereof.

Illustrative indicators can be or include, but are not limited to, a proprietary blend of Chromate(2-), [4-[(5-chloro-2-hydroxy-3-nitrophenyl)azo]-2,4-dihydro-5-methyl-2-phenyl-3H-pyrazol-3-onato(2-)][3-[[1-(3-chlorophenyl)-4,5-dihydro-3-methyl-5-oxo-1H-pyrazol-4-yl]azo]-4-hydroxy-5-nitrobenzenesulfonato(3-)]-, disodium, 1-methoxy-2-propanol, 1,2-propanediol, and 2-methoxypropanol, a crimson red solvent based red liquid dye commercially available from KEDA™ Dye of Manitowoc, Wis., Triple Glow Powder commercially available from GLONATION of Falmouth, Ky., or the like, or combinations thereof.

The one or more indicators can be present in an amount of from about 0.01 weight % to about 5 weight %, based on a total weight of the cure promoter composition. For example, the one or more indicators can be present in an amount of from about 0.01 weight %, about 0.05 weight %, about 0.1 weight %, about 0.5 weight %, about 1 weight %, about 2 weight %, or about 2.5 weight % to about 3 weight %, about 3.5 weight %, about 4 weight %, about 4.5 weight %, or about 5 weight %, based on a total weight of the cure promoter composition. In another example, the one or more indicators can be present in an amount of from about 0.01 weight % to about 5 weight %, about 2 weight % to about 4 weight %, or about 3 weight % to about 3.5 weight %, based on a total weight of the cure promoter composition.

The cure promoter composition can include one or more abrasives. As used herein, the term "abrasive" can also refer to materials commonly referred to as "polishing agents." The one or more abrasives can be capable of or configured to roughen the surface to facilitate, improve, or otherwise aid adhesion. The one or more abrasives can also be capable of or configured to roughen the surface to facilitate, improve, or otherwise aid adhesion, diffusion, migration, or contact of a surface in combination with cure promoter chemistry. The one or more abrasives can also be capable of or configured to facilitate, improve, or otherwise aid in the removal of debris and/or residue from the surface.

Illustrative abrasives of the cure promoter composition can be or include, but are not limited to, silica, alumina, hydrated alumina, silicates (e.g., zirconium silicate, aluminum silicate including calcined aluminum silicate), talc, sand, glass particles, aluminosilicates, barium sulfate, mica, diatomites, calcium carbonate, calcium sulfate, carbon, wollastonite, metaphosphate compounds, phosphate salts (e.g., insoluble phosphate salts), such as sodium metaphosphate, potassium metaphosphate, calcium pyrophosphate, magnesium orthophosphate, trimagnesium orthophosphate, tricalcium phosphate, dicalcium phosphate dihydrate, anhydrous dicalcium phosphate, calcium carbonate, magnesium carbonate, or the like, or combinations thereof.

The one or more abrasives can be present in an amount of from about 0.1 weight % to about 10 weight %, based on a total weight of the cure promoter composition. For example, the one or more abrasives can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the cure promoter composition. In another example, the one or more abrasives can be present in an amount of from about 0.1 weight % to about 10 weight %, about 2 weight % to about 8 weight %, or about 4 weight % to about 6 weight %.

The cure promoter composition can include one or more plasticizers. As used herein, the term "plasticizer" can refer to any component, compound, or substance that can facilitate, produce, or promote plasticity and flexibility and/or reduce brittleness. As such, one or more plasticizers can be incorporated to modify (e.g., increase or decrease) plasticity, flexibility, and/or brittleness of the cure promoter composition.

The one or more plasticizers can be present in an amount of from about 0.1 weight % to about 10 weight %, based on a total weight of the cure promoter composition. For example, the one or more plasticizers can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the cure promoter composition. In another example, the one or more plasticizers can be present in an amount of from about 0.1 weight % to about 10 weight %, about 2 weight % to about 8 weight %, or about 4 weight % to about 6 weight %.

The cure promoter composition can include one or more surfactants. As used herein, the term "surfactant" can refer to any component, compound, or substance that reduces surface tension in a solution or reduces interfacial tension between two liquids, or between a liquid and a solid. The one or more surfactants can be capable of or configured to facilitate or aid in the cleaning the surface of oil and/or debris. The one or more surfactants can be capable of or configured to facilitate migration or diffusion of one or more components of the cure promoter composition into the bulk of a sealant or coating layer. The one or more surfactants can be capable of or configured to better disperse any one or more components, particulates, or elements of the adhesion promoter composition with another one or more components, particulates, or elements of the adhesion promoter composition. In an exemplary implementation, the cure promoter composition includes at least one nonionic surfactant.

The one or more surfactants can be or include one or more anionic surfactants, one or more amphoteric surfactants, one or more cationic surfactants, one or more zwitterionic surfactants, one or more nonionic surfactants, or mixtures thereof. Illustrative surfactants of the cure promoter composition can be or include, but are not limited to, ionic surfactants and/or nonionic surfactants including octylphenoxy polyethoxy ethanols, such as TRITON™ X-100, X-114, and X-405, commercially available from Union Carbide Co. of Danbury, Conn.

The one or more surfactants can be present in an amount of from about 0.1 weight % to about 10 weight %, based on a total weight of the cure promoter composition. For example, the one or more surfactants can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the cure promoter composition. In another example, the one or more surfactants can be present in an amount of from about 0.1 weight % to about 10 weight %, about 2 weight % to about 8 weight %, or about 4 weight % to about 6 weight %.

The cure promoter composition can include one or more flame retardant agents. As used herein, the term "flame retardant agents" can refer to any component, compound, or substance that reduces, slows, or otherwise stops the spread and/or intensity of a fire. The one or more flame retardant agents can be capable of or configured to provide flame retardant properties to the cure promoter composition.

Illustrative flame retardant agents of the cure promoter composition can be or include, but are not limited to, halogenated species or phosphorous containing species, or the like, or combinations thereof.

The one or more flame retardant agents can be present in an amount of from about 0.1 weight % to about 10 weight %, based on a total weight of the cure promoter composition. For example, the one or more flame retardant agents can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the cure promoter composition. In another example, the one or more flame retardant agents can be present in an amount of from about 0.1 weight % to about 10 weight %, about 2 weight % to about 8 weight %, or about 4 weight % to about 6 weight %.

The cure promoter composition can include one or more biocides. As used herein, the term "biocides" can refer to any component, compound, or substance that kills or inhibits the growth of microorganisms such as bacteria, molds, slimes, fungi, or the like, or any combination thereof.

Illustrative biocides of the cure promoter composition can be or include, but are not limited to, chlorinated hydrocarbons, organometallics, halogen-releasing compounds, metallic salts, organic sulfur compounds, quaternary ammonium compounds, phenolics, or the like, or combinations thereof.

The one or more biocides can be present in an amount of from about 0.1 weight % to about 10 weight %, based on a total weight of the cure promoter composition. For example, the one or more biocides can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the adhesion promoter composition. In another example, the one or more biocides can be present in an amount of from about 0.1 weight % to about 10 weight %, about 2 weight % to about 8 weight %, or about 4 weight % to about 6 weight %.

Methods for preparing any one or more of the cure promoter compositions disclosed herein are provided. The method can include combining, mixing, blending, or otherwise contacting the one or more accelerators, the one or more compatibilizing carriers, the one or more catalysts, the optional one or more reducing agents, the one or more organic solvents, the one or more reactive silanes, the one or more reactive organometallics, the optional one or more gelling agents or acrylates, and/or the one or more optional functional additives (e.g., indicators, abrasives, plasticizers, surfactants, flame retardant agents, and/or biocides) with one another to prepare a mixture. It should be appreciated that the order of mixing or contacting each of the components of the cure promoter composition can be at least partially determined by the specific components selected. The method can also include purging the mixture with nitrogen to remove dissolved oxygen. The method can further include combining, mixing, blending, or otherwise contacting the mixture with one or more initiators and/or coinitiators. The method can also include forming a network between the one or more gelling agent acrylates. For example, the method can also include polymerizing and/or cross-linking the one or more acrylates of the mixture to prepare the one or more optional gelling agents of the cure promoter composition. It should be appreciated that alternatively, any of the other components of the cure promoter composition can be added before and/or after polymerizing and/or cross-linking the one or more acrylates of the mixture. The polymerization and/or cross-linking of the one or more acrylates can be performed at room temperature and/or with added heat. The method can also include exposing the mixture, including a photoinitiator, to predetermined wavelengths of light to promote polymerization and/or cross-linking. It should be noted that in embodiments as described herein, a gelled component may be fabricated separately and added to a cure promoter composition for the purpose of viscosity modification.

The method can also include subjecting the cure promoter composition to viscosity modification. For example, the method can include homogenizing the cure promoter composition via shearing and/or dicing in an industrial blender, immersion blender, centrifugal mixer, or the like, or any combination thereof. The cure promoter composition can be subjected to viscosity modification for a period of from about 5 seconds (sec), about 10 sec, about 30 sec, or about 1 min to about 2 min, about 3 min, about 5 min, about 10 min, about 30 min, or greater. The method can include adding additional organic solvents to the cure promoter prior to homogenizing the cure promoter composition. The cure promoter composition can be homogenized, for example, in a centrifugal mixer, in the presence of one or more particles. Illustrative particles can be or include, but are not limited to, one or more glass particles, ceramic particles, or the like, or any combination thereof.

The method can further include separating the one or more particles and/or relatively larger adhesion promoter agglomerations from the cure promoter composition after homogenization. For example, the method can include separating the particles and/or relatively larger adhesion promoter agglomerations from the adhesion promoter composition via filtration. Filtration can include passing the cure promoter composition including the one or more particles (e.g., glass particles) and/or the relatively larger adhesion promoter agglomerations through a filter having a pore size less than about 1 mm, less than about 0.5 mm, less than about 0.25 mm, or less than about 0.1 mm.

Methods for utilizing any one or more of the cure promoter compositions disclosed herein to treat an uncured sealant surface after the sealant is applied to a substrate are provided. The substrate can be any surface to be treated with a sealant. Surfaces or substrates may include, but are not limited to aluminum, titanium, carbon fiber composites, carbon fiber reinforced composites, thermoplastics, or combinations thereof. For example, the surface can be a surface of a bridge truss, support column, construction object, building, vehicle, such as an atmospheric vehicle, an aerospace vehicle, an unmanned vehicle, an aircraft, a spacecraft, a satellite, a rocket, a missile, or the like, or any components thereof.

The method for utilizing the cure promoter composition can include applying or contacting the cure promoter composition with the surface of an uncured sealant. The cure promoter composition can be contacted with the surface via a brush, a roller, an extrusion gun, a spray gun, or the like, or any combination thereof. The cure promoter composition can be capable of or configured to improve the efficiency of or eliminate one or more steps in the conventional process or method of preparing a surface for the application of a sealant. For example, in a conventional process of applying a sealant to a substrate, the sealant may be combined with a curative, crosslinker or cure promoter. The cure promoter composition disclosed herein may be configured to concurrently or simultaneously migrate into the bulk material of a sealant layer having no combined curative in its composition and causing a curing or crosslinking reaction within the sealant, thereby reducing the amount of curative needed for prior mixing of a sealant and potentially reducing some amounts of materials or processing steps in the conventional methods of the application of a sealant.

The method for utilizing the cure promoter composition to cause a curing reaction within an uncured sealant can include a cure promoter composition of one part or two parts. The method can further include a one-part cure promoter composition which is a combination of one or more organic solvents, a compatibilizing carrier, one or more optional reactive silanes, one or more optional organometallics, one or more optional reducing agents, and a catalyst having a pre-determined shelf life. The method can further include a two-part cure promoter composition that includes preparation by combining a first part including one or more organic solvents, a compatibilizing carrier, one or more optional reactive silanes, one or more optional organometallics, and one or more optional reducing agents with a second part including one or more organic solvents with a catalyst, which has a pre-determined shelf life before and after combining the parts. The method can further include combining a two-part cure promoter composition immediately prior to use or application.

The method for utilizing the cure promoter composition to treat a surface of an uncured sealant can include evaporating the one or more organic solvents of the cure promoter composition. The method can further include activating the one or more reactive silanes or reactive organometallics of the adhesion promoter composition. The method can further include pausing after applying the cure promoter composition to the sealant surface to allow the cure promoter time to react with the sealant or to migrate into the thickness of the sealant layer. The method can further include removing residual solvent or unreacted residue of the cure promoter composition from the sealant surface by physical wiping after activation. The method can also include filling a seal cap with a Class B sealant, disposing the seal cap, and applying the cure promoter adjacent or onto the sealant surface, and allowing the sealant to cure. The method can further include curing the Class B sealant or applying the cure promoter composition to the surface of the Class B sealant, a resin, a paint layer, or a paint composition. Alternatively, a paint or primer may be applied onto the surface of the cured sealant, which has been treated with a surface application of the cure promoter. The method can also include filling a seal cap with a thixotropic sealant and disposing the seal cap after the application of the cure promoter composition on the surface, followed by a second application of cure promoter, thus exposing multiple surfaces of the sealant to an application of the cure promoter. Similarly, the method can also include extruding the thixotropic sealant on the aircraft structure after application of the cure promoter composition on the surface.

EXAMPLES

The examples and other implementations described herein are exemplary and not intended to be limiting in describing the full scope of compositions and methods of this disclosure. Equivalent changes, modifications and variations of specific implementations, materials, compositions and methods can be made within the scope of the present disclosure, with substantially similar results.

Materials used in the following Examples were obtained as follows: Methyl ethyl ketone (MEK), Methyl propyl ketone (MPK), Allyl sulfide (AS), Pentaerythritol tetrakis (3-mercaptopropionate) (PTMP), Zinc-diethyldithiocarbamate (Zn-diS), Zinc-acetate dihydrate (Zn—H2O), Tetraethylthiuram disulfide (Disulfiram), 1-methylimidazole (MeI), (3-Glycidyloxypropyl)trimethoxysilane (GlycidylSilane), and (3-Mercaptopropyl)trimethoxysilane (MercaptoSilane) are all commercially available from SIGMA-ALDRICH® of St. Louis, Mo. LICA 97 or Titanium IV 2,2(bis 2-propenolatomethyl) butanolato, tris (3-amino) phenylato is commercially available from Kenrich Petrochemicals, Bayonne, N.J. Thiokol™ LP3 (LP3) liquid polysulfide polymer was obtained from Toray Fine Chemicals, Co., Ltd. and Polysulfide sealant Class B-2 WS8035 was obtained from Royal Adhesives and Sealants of South Bend, Ind.

Example 1

An exemplary series of cure promoter compositions was prepared as shown in Table 1 below. This set of samples in Example 1 illustrate the synthesis of cure promoter solutions that when applied on uncured sealant, Royal WS8035, would reduce the time to obtain a tack-free surface. Each component is expressed in weight percent of the total weight of the cure promoter composition. The accelerator was first dissolved into solvent, then the dicumyl peroxide catalyst was stirred in if the recipe for the sample is so designated. The reducing agent, or amine was added last. The mixing can be done with a 10 gram scale vortex mixer, 100-500 g scale stir plate, or an overhead stirrer for sample sizes larger than 500 g. This solution was brushed or sprayed over an uncured sealant. The commercial sealant was prepared as instructed from technical data sheet. The surface was tack free in less than an hour with both samples 5 and 6 from Example 1.

TABLE 1

| Sample # | Accelerator | Solvent | Catalyst | Reducing Agent | Surface tack free time |
|---|---|---|---|---|---|
| 5 | Disulfiram 2.5% | MEK/MPK 95% | — | 1-Methylimidazole 2.5% | <1 h |
| 6 | Disulfiram 2.5% | MEK/MPK 95% | Dicumyl peroxide 1% | 1-Methylimidazole 2.5% | <1 h |

Example 2

Another exemplary series of cure promoter compositions was prepared as shown in Table 2 below. This set of samples in Example 2 illustrate the synthesis of cure promoter solutions that when applied on uncured sealant, Royal WS8035, would reduce the time to obtain a tack-free surface. Each component is expressed in weight percent of the total weight of the cure promoter composition. Various reducing agents, or amine compositions were utilized in the samples within Example 2, and were prepared similarly to the procedures outlined in Example 1.

TABLE 2

| Sample # | Accelerator | Solvent | Catalyst (Peroxide) | Reducing Agent | Surface Tack Free Time |
|---|---|---|---|---|---|
| 0 | Control Sample | | | | >3 h |
| 1 | Disulfiram, 4.0% | MEK/MPK, 95% | — | m-Xylylenediamine, 1% | <1 h |
| 2 | Disulfiram, 4.0% | MEK/MPK, 95% | — | 4,N,N-Trimethyl aniline, 1% | <1 h |
| 3 | Disulfiram, 4.0% | MEK/MPK, 95% | — | LICA97, 1% | <1 h |
| 4 | Disulfiram, 4.0% | MEK/MPK, 95% | — | 1-Methylimidazole, 1% | <1 h |
| 5 | Disulfiram, 2.5% | MEK/MPK, 95% | Dicumyl peroxide, 1.5% | 1-Methylimidazole, 1% | <1 h |

TABLE 3

| Sample # | Accelerator 1 | Accelerator 2 | Solvent | Reducing Agent | Surface Tack Free Time |
|---|---|---|---|---|---|
| 0 | Control Sample | | | | >3 h |
| 4 | Disulfiram, 4.0% | — | MEK/MPK, 95% | 1-Methylimidazole, 1% | 1 h |
| 6 | | Zinc-disulfiram, 4% | MEK/MPK, 95% | 1-Methylimidazole, 1% | 1 h |
| 7 | Disulfiram, 2% | Zinc-hydrate, 2% | MEK/MPK, 95% | 1-Methylimidazole, 1% | 1 h |
| 8 | | Zn-disulfiram 2%, Zn-hydrate 2% | MEK/MPK, 95% | 1-Methylimidazole, 1% | 1 h |

Example 3

Another exemplary series of cure promoter compositions was prepared as shown in Table 3 below. This set of samples in Example 3 illustrate the synthesis of cure promoter solutions that when applied on uncured sealant, Royal WS8035, would reduce the time to obtain a tack-free surface. Each component is expressed in weight percent of the total weight of the cure promoter composition. Various metal complexes and accelerators were utilized in the samples within Example 3 and were prepared similarly to the procedures outlined in the preceding examples.

Example 4

Another exemplary series of cure promoter compositions was prepared as shown in Table 4 below. This set of samples in Example 4 illustrate the synthesis of cure promoter solutions that when applied on uncured sealant, Royal WS8035, would reduce the time to obtain a tack-free surface. Each component is expressed in weight percent of the total weight of the cure promoter composition. Various compatibilizing carriers were utilized in the samples within Example 4 and were prepared similarly to the procedures outlined in the preceding examples with the compatibilizing carrier added after the accelerator.

TABLE 4

| Accelerator | Reducing Agent | Compatibilizing Carrier | Solvent | Surface Tack Free Time | Shore A @ 3 h | Shore A @ 4 h |
|---|---|---|---|---|---|---|
| Control Sample | | | | >3 h | Tacky | — |
| Disulfiram, 4.0% | 1-Methylimidazole, 1% | Xylenes, 5% | MEK/MPK, balance | <1 h | 9.57 | — |
| Disulfiram, 4.0% | 1-Methylimidazole, 1% | Xylenes, 10% | MEK/MPK, balance | <1 h | 9.47 | — |
| Disulfiram, 4.0% | 1-Methylimidazole, 1% | Cyclohexane, 5% | MEK/MPK, balance | <1 h | 10.67 | — |
| Disulfiram, 4.0% | 1-Methylimidazole, 1% | Cyclohexane, 10% | MEK/MPK, balance | <1 h | 17.13 | — |
| Disulfiram, 4.0% | 1-Methylimidazole, 1% | Styrene, 5% | MEK/MPK, balance | <1 h | 10.60 | — |
| Disulfiram, 4.0% | 1-Methylimidazole, 1% | Styrene, 10% | MEK/MPK, balance | <1 h | 25.63 | — |
| Disulfiram, 4.0% | 1-Methylimidazole, 1% | Liquid polysulfide, 5% | MEK/MPK, balance | 3 h | 18.00 | — |
| Disulfiram, 4.0% | 1-Methylimidazole, 1% | Liquid polysulfide, 10% | MEK/MPK, balance | <1 h | 21.9 | — |
| Disulfiram, 4.0% | 1-Methylimidazole, 1% | Liquid polysulfide, 15% | MEK/MPK, balance | <1 h | — | 20.7 |
| Disulfiram, 4.0% | 1-Methylimidazole, 1% | allyl sulfide, 5% | MEK/MPK, balance | <1 h | 26.37 | |
| Disulfiram, 4.0% | 1-Methylimidazole, 1% | allyl sulfide, 10% | MEK/MPK, balance | <1 h | 16.5 | 23.1 |
| Disulfiram, 4.0% | 1-Methylimidazole, 1% | allyl sulfide, 15% | MEK/MPK, balance | <1 h | 10.5 | 24 |
| Disulfiram, 4.0% | 1-Methylimidazole, 1% | Liquid polysulfide 10% + Allyl Sulfide 5% | MEK/MPK, balance | <1 h | 5.8 | 23.8 |
| Disulfiram, 4.0% | 1-Methylimidazole, 1% | — | MEK/MPK, balance | <1 h | 17.7 | — |

Example 5

Another exemplary series of cure promoter compositions was prepared as shown in Table 5 below. This set of samples in Example 5 illustrate the synthesis of cure promoter solutions that when applied on uncured sealant, Royal WS8035, would reduce the time to obtain a tack-free surface. Each component is expressed in weight percent of the total weight of the cure promoter composition. Various adhesion promoters were utilized in the samples within Example 5 and were prepared similarly to the procedures outlined in the preceding examples with the adhesion promoter added after the compatibilizing carrier.

TABLE 5

| Accelerator | Reducing Agent | Comp. Carrier | Adhesion Promoter Glycidyl Silane | Adhesion Promoter Mercapto Silane | Adhesion Promoter LICA 97 | Solvent | Surface Tack Free Time |
|---|---|---|---|---|---|---|---|
| Disulfiram, 4.0% | 1-Methylimidazole, 1% | allyl sulfide, 15% | 5.00% | — | — | MEK/MPK, 75% | <1 h |
| Disulfiram, 4.0% | 1-Methylimidazole, 1% | allyl sulfide, 15% | 4.00% | 1.00% | — | MEK/MPK, 75% | <1 h |
| Disulfiram, 4.0% | 1-Methylimidazole, 1% | allyl sulfide, 15% | 3.50% | 0.75% | 0.75% | MEK/MPK, 75% | <1 h |
| Disulfiram, 4.0% | 1-Methylimidazole, 1% | | 3.50% | 0.75% | 0.75% | MEK/MPK, 90% | <1 h |

Example 6

Another exemplary series of cure promoter compositions was prepared as shown in Table 6 below. This set of samples in Example 6 illustrate the synthesis of cure promoter solutions that when applied on uncured sealant, Royal WS8035, would reduce the time to obtain a tack-free surface. Each component is expressed in weight percent of the total weight of the cure promoter composition. Various combinations of the preceding examples were prepared in the samples within Example 6 and were prepared similarly to the procedures outlined in the preceding examples.

TABLE 6

| Sample # | Accelerator | Reducing Agent | Comp. Carrier | Adhesion Promoter Glycidyl Silane | Adhesion Promoter Mercapto Silane | Adhesion Promoter LICA 97 | Solvent | Surface Tack Free Time |
|---|---|---|---|---|---|---|---|---|
| CP1 | Disulfiram, 4.0% | 1-Methylimidazole, 1% | 15% PTMP | — | — | — | MEK/MPK, 80% | <1 h |
| CP2 | Disulfiram, 4.0% | 1-Methylimidazole, 1% | allyl sulfide, 15% | — | — | — | MEK/MPK, 80% | <1 h |
| CP3 | Disulfiram, 4.0% | 1-Methylimidazole, 1% | 15% PTMP, 5% allyl sulfide | — | — | — | MEK/MPK, 75% | <1 h |
| ACP | Disulfiram, 4.0% | 1-Methylimidazole, 1% | 15% PTMP | 3.50% | 0.75% | 0.75% | MEK/MPK, 75% | <1 h |

Example 7

Polysulfide sealant WS8035 was mixed according to the supplier instructions without any curative and casted on a non-stick fluoropolymer mold. A solution of CP2 from Example 6 was brushed onto the top surface of the sealant. The sealant was evaluated for a tack free surface after 1 hour, and was abraded after 4 hours. The sanding was performed for a minimum duration of 30 seconds using a Makita finishing sander with a 3M® 7445 Scotch-Brite™ pad. The sample, unabraded, exhibited a glossy tack free surface after 1 hour. After abrasion, the sample exhibited a matte abraded surface that was not wrinkled under the pressure of the sander, indicating a complete, accelerated cure.

Application and Testing Methods

After synthesis of the cure promoter compositions the solutions are brushed or sprayed on uncured sealants as described herein. Testing protocols are conducted using the following methods as described. Polysulfide sealant samples were prepared as described in the preceding examples by mixing according to the supplier instructions and casting onto a non-stick fluoropolymer mold.

Tackiness test: polysulfide sealant was casted on a non-stick fluoropolymer mold to a dimension of 1" by 1" and a 0.25" thickness. Immediately follow the casting, the exemplary formulations in the examples were brushed on top of the uncured sealant. Surface tackiness was assessed by contacting the sealant surface with a polyester (PET) film. After separating if there is no residue on the PET film the surface is determined to be tack free.

Shore A test: in some exemplary examples, a Shore A durometer test was done by pressing the Shore A durometer on the tack free sealant surface and recording the values. Three measurements were done per sample, with the average of the three values reported.

Power sanding test: in some examples, the tack free surface was subjected to a sanding by an electric sander (Makita BO4556K) with an attached 3M® Scotch-Brite™ 7445 pad as a sanding surface. Samples of 2" by 3" and a 0.25" thickness were sanded for at least 30 s. Qualified samples are ones that do not wrinkle and where any dust resulting from the sanding can be wiped clean without sticking to the sealant surface.

Liquid deposition: Approximately 0.5 mL of exemplary cure promoter composition was transferred onto the surface of the uncured sealant by completely wetting a clean brush or roller with cure promoter solution prior to application. Approximately 0.5 mL of promoter solution per square inch of the uncured sealant is brushed directly onto the sealant surface. The top of the sealant surface is tack free after 1 hour and can be sanded after 4 hours. The brushes and rollers can be cleaned afterwards by washing with acetone and isopropanol.

Spray coating: Approximately 10 mL of exemplary cure promoter composition was transferred to a glass container and the container hooked to an Iwata airbrush spray gun. The uncured sealant surface was coated in 1 pass. The top surface of the sealant surface is tack free after 1 hour and can be sanded after 4 hours.

The following description of various aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any examples or implementations disclosed herein. Accordingly, the disclosed range should be construed to have specifically disclosed all the possible subranges as well as individual numerical values within that range. As such, any value within the range can be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight of total solids. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that can be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

The present disclosure has been described with reference to exemplary implementations. Although a limited number of implementations have been shown and described, it will be appreciated by those skilled in the art that changes can be made in these implementations without departing from the principles and spirit of the preceding detailed description. It is intended that the present disclosure be construed as including all such modifications and alterations insofar as they come within the scope of the appended claims or the equivalents thereof.

The present disclosure has been described with reference to exemplary implementations. Although a limited number of implementations have been shown and described, it will be appreciated by those skilled in the art that changes can be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A cure promoter composition, consisting of:
    an accelerator comprising a thiocarbamate, a hydrated thiocarbamate, a dithiocarbamate, a thiazole, a mercaptothiazole, a sulfenamide, a thiazolesulfenamide, a metal salt of thiocarbamate, sulfur chloride, or combinations thereof;
    a compatibilizing carrier;
    one or more organic solvents;
    a catalyst;
    a reducing agent;
    one or more reactive silanes;
    one or more reactive organometallics;
    one or more gelling agents; and
    an aqueous component.

2. The cure promoter composition of claim 1, wherein the accelerator is disulfiram.

3. The cure promoter composition of claim 1, wherein the compatibilizing carrier comprises a monomer, an oligomer, a low molecular weight poly sulfides, a low molecular weight poly thiol, a low molecular weight vinyl functional compound, an organic solvent, or combinations thereof.

4. The cure promoter composition of claim 3, further comprising pentaerythritol tetrakis(3-mercaptopropionate), trimethylolpropane tris(3-mercaptopropionate), 2,2'-thiodiethanethiol, 2,2'-(ethylenedioxy)diethanethiol, tris(mercaptoalkyl) cyclohexanes, or combinations thereof.

5. The cure promoter composition of claim 3, wherein the compatibilizing carrier comprises a low molecular weight poly sulfide.

6. The cure promoter composition of claim 1, wherein the compatibilizing carrier comprises allyl monosulfide, allyl disulfide, ethyl vinyl sulfide, phenyl vinyl sulfide, styrene, or combinations thereof.

7. The cure promoter composition of claim 1, wherein the one or more organic solvents comprise an aliphatic hydrocarbon, an aromatic compound, a ketone, an amine, an ester, an alcohol, an aldehyde, an ether, or combinations thereof.

8. The cure promoter composition of claim 1, wherein the catalyst comprises an amidine, a diazole, an amine, a pyridine, or combinations thereof.

9. The cure promoter composition of claim 1, wherein the cure promoter composition comprises one or more reducing agents, the reducing agent comprising cysteamine, betamercaptoethanol, dithiothreitol, tri s(2-carboxyethyl) phosphine hydrochloride, dithiobutylamine, glutathione, or combinations thereof.

10. The cure promoter composition of claim 9, wherein the reducing agent comprises cysteamine.

11. The cure promoter composition of claim 1, wherein the cure promoter composition comprises one or more reactive silanes, the one or more reactive silanes comprising a glycidoxypropyltrimethoxysilane, a mercaptopropyltrimethoxysilane, or combinations thereof.

12. The cure promoter composition of claim 11, wherein the cure promoter composition comprises a glycidoxypropyltrimethoxysilane.

13. The cure promoter composition of claim 11, wherein the cure promoter composition comprises a mercaptopropyltrimethoxysilane.

14. The cure promoter composition of claim 1, wherein the cure promoter composition comprises one or more reactive organometallics, the one or more reactive organometallics comprising a reactive titanate, a reactive zirconate, a reactive aluminate, or combinations thereof.

15. The cure promoter composition of claim 1, wherein the cure promoter comprises one or more gelling agents, and wherein the one or more gelling agents comprises has a viscosity of about 0.001 to about 2000 Pa·s at a shear rate of about 0.1 to about 100 $\sec^1$.

16. The cure promoter composition of claim 1, wherein the cure promoter composition comprises no gelling agent and the cure promoter composition has a viscosity of about 0.001 to about 50 Pa-s at a shear rate of about 0.1 to about 100 $\sec^1$.

17. The cure promoter composition of claim 1, wherein the accelerator comprises a thiocarbamate.

18. The cure promoter composition of claim 1, wherein the accelerator comprises a hydrated thiocarbamate.

19. The cure promoter composition of claim 1, wherein the accelerator comprises a dithiocarbamate.

20. The cure promoter composition of claim 1, wherein the accelerator comprises a thiazole.

* * * * *